US011358012B2

(12) United States Patent
Palmieri (10) Patent No.: US 11,358,012 B2
(45) Date of Patent: Jun. 14, 2022

(54) MEMBRANE VALVE AND MANUFACTURING METHOD THEREFOR

(71) Applicant: Mares S.p.A., Rapallo (IT)

(72) Inventor: Valerio Palmieri, Rapallo (IT)

(*) Notice: Subject to any disclaimer, the term of this patent is extended or adjusted under 35 U.S.C. 154(b) by 713 days.

(21) Appl. No.: 16/232,001

(22) Filed: Dec. 25, 2018

(65) Prior Publication Data
US 2019/0224506 A1 Jul. 25, 2019

(30) Foreign Application Priority Data
Jan. 25, 2018 (IT) .................. 102018000001827

(51) Int. Cl.
*A62B 18/10* (2006.01)
*B63C 11/16* (2006.01)
(Continued)

(52) U.S. Cl.
CPC ............... *A62B 18/10* (2013.01); *A62B 9/02* (2013.01); *B63C 11/16* (2013.01); *F16K 15/144* (2013.01);
(Continued)

(58) Field of Classification Search
CPC ..... A62B 18/10; A62B 9/04; A62B 9/02–027; A62B 18/02; A62B 18/08; A62B 23/02;
(Continued)

(56) References Cited

U.S. PATENT DOCUMENTS 4,501,272 A * 2/1985 Shigematsu ........... A62B 23/02
128/206.15
4,909,245 A * 3/1990 Wollenhaupt ..... A61M 16/0048
128/202.28
(Continued)

FOREIGN PATENT DOCUMENTS

CN 203823160 9/2014
DE 102008062532 6/2009
(Continued)

OTHER PUBLICATIONS

Italian Ministry of Economic Development, Search Report (by the European Patent Office, dated Sep. 27, 2018).

*Primary Examiner* — Justine R Yu
*Assistant Examiner* — Benjamin M. Kusiak
(74) *Attorney, Agent, or Firm* — Themis Law (57) ABSTRACT

A diaphragm or non-return valve is disposed in a supporting wall and includes a diaphragm plug and a valve seat having a passage opening surrounded by a continuous surface for sealing adhesion contact of a sealing lip of the diaphragm plug. The diaphragm plug is made as one piece and is of the same elastic, flexible material as the supporting wall, from which the diaphragm plug is separated along its perimetric edge by slots having a predetermined length. The diaphragm plug and the supporting wall are connected by at least two material bridges provided on opposite sides of the perimetric edge of the diaphragm plug, and the valve seat is configured as a shaped plate locked to the supporting wall in a position coincident with the diaphragm plug by a tightening ring, the valve seat and the tightening ring being engaged by elements passing through at least part of the slots.

13 Claims, 5 Drawing Sheets

(51) Int. Cl.
*F16K 15/14* (2006.01)
*A62B 9/02* (2006.01)
*F16K 15/16* (2006.01)
*F16K 27/02* (2006.01)

(52) U.S. Cl.
CPC .......... *F16K 15/16* (2013.01); *F16K 27/0209* (2013.01); *B63C 2011/165* (2013.01)

(58) Field of Classification Search
CPC .... F16K 15/16; F16K 27/0209; F16K 15/144; F16K 15/148; F16K 15/14; B63C 11/16; B63C 2011/165; B63C 11/12–207; B63C 11/18; B63C 11/205; B63C 2011/182; A61M 16/207; A61M 2202/0225; A61M 16/20–209; Y10T 137/7895; Y10T 137/7888
USPC ............ 128/201.11, 206.12, 206.15, 206.17, 128/206.28, 205.27
See application file for complete search history.

(56) References Cited

U.S. PATENT DOCUMENTS

| | | | | |
|---|---|---|---|---|
| 5,062,421 A | * | 11/1991 | Burns | A62B 18/025 |
| | | | | 128/205.27 |
| RE35,062 E | * | 10/1995 | Brostrom | A62B 18/08 |
| | | | | 128/206.12 |
| 5,564,130 A | * | 10/1996 | Feng | B63C 11/12 |
| | | | | 128/207.12 |
| 5,732,695 A | * | 3/1998 | Metzger | A62B 23/02 |
| | | | | 128/206.12 |
| 5,890,234 A | * | 4/1999 | Lan | B63C 11/12 |
| | | | | 2/428 |
| 6,050,285 A | * | 4/2000 | Goncze | G05D 16/065 |
| | | | | 137/315.05 |
| 6,164,333 A | | 12/2000 | Maurphy | |
| 8,336,547 B1 | * | 12/2012 | Ritchie | A62B 18/10 |
| | | | | 128/204.29 |
| 10,105,556 B2 | * | 10/2018 | Simmonds | A62B 23/02 |
| 2007/0101990 A1 | * | 5/2007 | Hacke | A61M 16/1065 |
| | | | | 128/201.25 |
| 2020/0115015 A1 | * | 4/2020 | Sang | A62B 9/02 |
| 2021/0086882 A1 | * | 3/2021 | Grimaldi | A63B 33/00 |
| 2021/0129958 A1 | * | 5/2021 | Sorigue | B63C 11/16 |

FOREIGN PATENT DOCUMENTS

| | | |
|---|---|---|
| EP | 2014325 | 1/2009 |
| GB | 2478027 | 8/2011 |
| WO | 03097142 | 11/2003 |

* cited by examiner

MEMBRANE VALVE AND MANUFACTURING METHOD THEREFOR

FIELD OF THE INVENTION

The present invention relates to a membrane valve and a method for its manufacturing.

In particular, the present invention relates to diaphragm valves of the type used in equipment in the field of underwater activities such as for example, but without limitation, to the combination of a diaphragm valve and a diving mask.

BACKGROUND OF THE INVENTION

Figure 8:
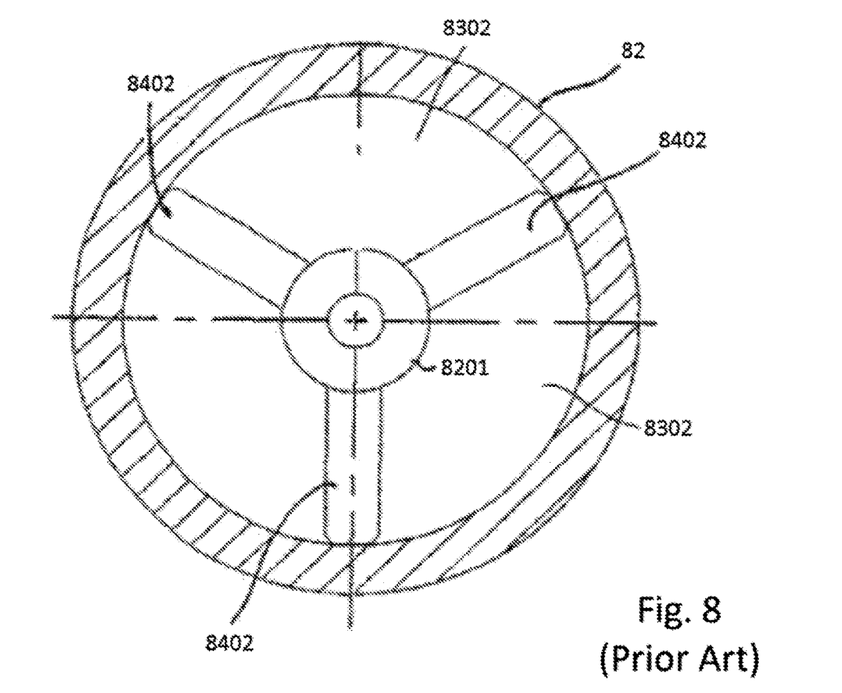
FIGS. 8 and 9 show an example of a diaphragm valve according to the state of the art.
Figure 9:
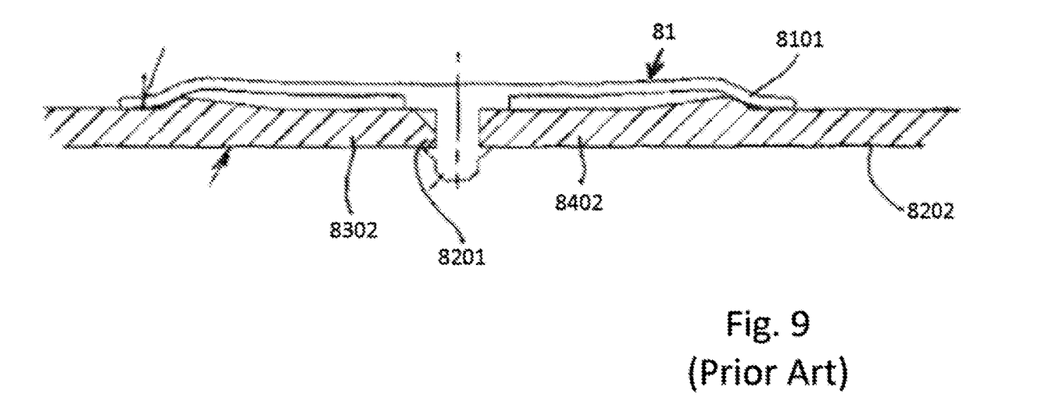

FIGS. 8 and 9 show a typical diaphragm valve or non-return valve known in the art. In this configuration of an example of a diaphragm valve, said valve comprises a plug disk (81) made of elastic flexible material cooperating with a valve seat (82) composed of at least one passage opening (8302). The passage opening (8302) is provided in a wall (8202) and the plug disk (81) comprises fastening means (8201) to fasten to the valve seat (82). In this example said fastening means are engaged in at least one complementary fastening housing (8102) of the valve seat (82). Said fastening seat is supported by radial elements (8402). This has a central hole engaging a locking pin of the plug disk to the valve seat itself. The valve seat (82) further comprises a continuous surface closed on itself, for sealing and adhesion contact of at least one corresponding perimetrical sealing lip (8101) of the plug disk (81). Said contact surface of the valve seat (82) with the sealing lip (8101) of the plug disk (81) and said sealing lip surround the at least one passage opening (8302).

Generally, the plan shape of the diaphragm plug is substantially circular, however there are variations wherein the shape is elongated with semi-circular or elliptical shaped ends or other different shapes are provided.

As it is apparent the diaphragm or non-return valve according to the state of the art provides for the diaphragm being a part separated and couplable to the valve seat. While the diaphragm is of flexible and elastic material, the valve seat is generally made of rigid or substantially non-deformable material.

The valve seat can be made in one piece with a supporting wall when said wall is of rigid material, however it has to be composed of a separated constructional piece, when the supporting wall for the same is made of soft material, such as for example rubber, silicone or other flexible and elastically deformable material. In addition, the fastening to said flexible supporting wall requires additional sealing tightening elements for the valve seat for example to the peripheral edge of a through opening of said supporting wall. A constructional example can provide that the valve seat cooperates with a fastening ring nut that can be tightened against said valve seat and such that the peripheral edge of a delimiting wall of an opening for mounting the valve seat is sealingly tightened between two annular peripheral flanges of the tightening ring nut and the valve seat respectively.

The above should not constitute any constructional restriction and is only a known configuration example showing that the diaphragm valves according to the state of the art require at least two, often three, separated constructional parts, when mounted on flexible supports.

Other examples of constructional configurations of known diaphragm valves are described in the documents GB1351384, U.S. Pat. Nos. 1,867,478, 4,414,973, 6,412,514 e EP1445521 (A1).

SUMMARY OF THE INVENTION

The invention aims to improve the construction of a diaphragm valve, specifically a non-return valve, particularly a diaphragm valve mounted on a supporting wall made of flexible and/or elastically deformable material.

The invention also aims to a process for manufacturing an object comprising a supporting wall for a diaphragm valve and a diaphragm valve.

A further object of the present invention is to implement a device for underwater activity equipment device, such as for example a diving mask or the like.

Still a further object of the present invention is to implement a process for manufacturing a diving mask comprising a non-return diaphragm valve.

According to a first embodiment, object of the invention is a diaphragm valve or non-return valve in combination with a supporting wall for said diaphragm valve, which wall is made of flexible and elastically deformable material such as rubber, silicone, or the like, and wherein said diaphragm valve comprises:

a diaphragm plug made of elastic, flexible material;

a valve seat comprising at least one passage opening surrounded by a continuous surface closed on itself, for sealing contact of at least one corresponding sealing lip of the diaphragm plug, characterized in that the diaphragm plug is made in one piece with and of the same material as the supporting wall, it being separated along its perimetrical edge from said supporting wall by slots delimiting said perimetrical edge and that have a predetermined width, while said diaphragm plug is connected to the supporting wall by means of two material bridges provided on opposite sides of the perimetrical edge of said diaphragm plug;

the valve seat being provided in the form of a shaped plate and it being locked to the supporting wall in a position coinciding with the diaphragm plug by an annular tightening element, the valve seat being provided on one side of the supporting wall and the tightening ring on the opposite side of the supporting wall and the valve seat and/or the tightening ring having mutual engagement means passing through at least part of said slots.

In reference to the term supporting wall, it is meant of a body of a device separated from said valve and to which the valve itself is intended to be applied in order to adjust the passage of a fluid flow across the parts of a wall of said supporting body.

Therefore, the present invention clearly relates to a combination of a diaphragm valve or a non-return valve and a body of a separate device, which body comprises a wall delimiting a compartment internal to said body from the external environment and which valve is intended to be mounted at a through opening in said wall in order to adjust the passage of a fluid through said wall and said opening being provided in a part of said wall made of flexible and possibly also elastic material.

Product examples are for example devices such as casings closed on themselves and intended to delimit an inner compartment such as bags, balloons, tanks, or flexible and/or elastic partition walls of two adjacent environments.

A particular application relates to the accessories for water sports, such as for example, masks, snorkels, wet suits, inflatable bags and/or other similar accessories.

It is clear that the invention allows the diaphragm, which is made during the same process for forming said body, to be obtained. In addition, the diaphragm plug always remains constrained to the body and thus also when cleaning operations have to be done, the diaphragm constituting a relatively fragile and small part, is not likely to be lost thus impairing the device functionality.

In an embodiment, the diaphragm plug has a circular or elliptical or ovoid shape or an elongated shape with semi-circular shaped ends, while the two material bridges connecting the diaphragm plug to the supporting wall are provided along an axis of symmetry of said plan shape of the diaphragm plug.

An embodiment variation provides that the mutual tightening means for the valve seat and the tightening ring are composed of axial appendages of the tightening ring, which appendages are elastically flexible and have end teeth overlapping the side of the valve seat opposite the supporting wall, said appendages having such a length to exert, in the condition coupled to the valve seat, a sealing compression for it and the tightening ring against the supporting wall.

A preferred variation provides that the shape of the diaphragm plug is circular, it being separated from the supporting wall by two semi-circular slots separated from each other by a material bridge and wherein the two material bridges are arranged diametrically opposite each other and aligned along the same diametral axis, while the valve seat is composed of a washer element having such an outer and inner diameter to overlap a peripheral strip of the diaphragm plug that is the sealing lip thereof, while the tightening ring has sealing and mutual fastening means for the valve seat.

These means can be made according to the preceding embodiment.

A possible embodiment variation can provide that the tightening members are of the screw type, the valve seat or the tightening ring being provided with an inner thread and with externally threaded axial appendages respectively, intended to pass through the slots and to engage said inner threads.

According to an embodiment variation, the material bridges can also be provided aligned along an axis secant to the plan shape of the diaphragm plug and eccentric or inclined with respect to a diametral or symmetry axis.

Still according to an embodiment, the valve seat can have at least one inner rib connecting two opposite points of the inner annular edge.

In reference to the embodiment variation wherein the valve seat and the diaphragm plug have a circular symmetry or a circular shape, said rib is oriented according to at least one diametral direction.

An embodiment provides that said diametral direction is transverse and particularly perpendicular to the axis along which the two material bridges connecting the diaphragm plug to the supporting wall are aligned.

An additional embodiment can provide two or more ribs 150, 150' oriented according to two or more different diametral directions or directions secant the annular shape of the valve seat.

These ribs have mechanical supporting function for the diaphragm in the regions surrounded by the sealing lip and under the action of fluid pressures.

According to a further aspect the object of the present invention is a method for manufacturing a diaphragm valve in combination with a flexible and/or elastically deformable supporting wall, which method provides the following steps:

producing the diaphragm plug of the same material as the supporting wall and during the same step forming the supporting wall, by providing to separate the diaphragm plug from the remaining supporting wall by slots surrounding the perimetrical shape of the diaphragm plug, which slots are interrupted in at least two points aligned with each other and provided on opposite sides of the perimetrical shape of the diaphragm plug by material bridges connecting said diaphragm plug to the remaining supporting wall;

producing the valve seat in the form of a plate provided with a sealing surface cooperating with a sealing lip of the diaphragm plug and with a tightening flange of an annular strip of the supporting wall surrounding said valve seat;

producing a tightening ring provided with a flange tightening the supporting wall substantially corresponding to that of the valve seat;

providing, on the valve seat and/or on the tightening ring, mutual mechanical coupling means passing through one or more of said slots separating the diaphragm plug from the remaining supporting wall;

locking the valve seat to the tightening ring by means of said mechanical coupling means generating the sealing tightening between said flanges of the valve seat and of the tightening ring of the annular strip of the supporting wall surrounding the diaphragm plug.

Object of the invention is an equipment element for underwater activities, having a body with at least one wall made of flexible and/or elastically deformable material and being provided in combination with a diaphragm valve intended to be placed at said flexible and/or elastically deformable wall and wherein said diaphragm valve is made according to one or more of the preceding embodiments.

An embodiment provides that said diaphragm valve is provided in combination with a diving mask or a similar device.

The invention also provides a method for manufacturing an equipment device for underwater activities and specifically a diving mask having in combination a diaphragm valve according to one or more of the afore described variations and arranged in the region of at least one wall of flexible and/or elastically deformable material of the body of said equipment device and which method provides for manufacturing the combination of said part of wall of flexible and/or elastically deformable material and of the diaphragm valve the afore described method steps.

Further characteristics and improvements of the invention are described hereinafter.

BRIEF DESCRIPTION OF THE DRAWINGS

The characteristics and the advantages of the invention will better result from the description of a preferred exemplary embodiment.

DETAILED DESCRIPTION OF EMBODIMENTS OF THE INVENTION

The mask described in the figures is of the type described in the document WO2015/170013. Although the invention is described only in reference to this type of mask, it has to be noted that such an example should not be limited in relation to applications to different devices or objects, it being perfectly clear to the person skilled in the art that the flexible and/or elastically deformable wall, which is in the mask and at which the diaphragm valves made according to the present invention are provided, can be part of any other object or device and thus the implementation of the present invention in other devices or objects does not substantially differ from what submitted with this specific example.

In fact, it is sufficient that the different object or device is provided with a body having at least one part of a wall made of flexible and/or elastically material and wherein a diaphragm valve is provided to be placed, the construction or the operation of the diaphragm valve not affecting the additional characteristics of the device.

FIGS. 1 to 7 describe a mask comprising a frame, a transparent part supported by the frame, a seal part mounted on the frame and intended to be placed on a user face and a snorkel ("ventilation tube"). The seal part comprises a partition wall adapted to be rested on the user's nose, when the mask is worn, so as to form an upper chamber and a lower chamber, the lower chamber accommodating the nose and the mouth of the user. The two chambers are in communication only through at least one passage provided in the partition wall and through a one-way, non-return valve that opens and closes said passage such that air can pass from the upper chamber to the lower chamber and not vice versa. The snorkel, comprising at least one first and one second channel that put the upper chamber and the lower chamber in communication with the external environment respectively, cooperates with a hub integral to the mask. The hub is fastened or fastenable at an opening of the seal part that puts the first channel of the snorkel in communication with the upper chamber of the mask and has an inlet connecting to an exhaust tube that puts the lower chamber in communication with the second channel of the snorkel, for exhausting the exhaled air.

This allows increasing the strength and safety of the mask since possible breakings of the frame upon accidental impacts do not make the mask useless since the exhaled air is conveyed towards the snorkel through one, preferably two, exhaust tubes which are not integrated in the frame of the mask itself and further made of relatively soft and elastically deformable plastic material, such as for example the same material as the seal part of the mask.

Advantageously the duct or ducts for the exhaled air run, in fact, externally to the mask in proximity of the edge of the seal part.

A very compact solution is also possible, according to which the duct or ducts for the exhaled air run internally to the mask sealingly crossing one or two holes provided in the partition wall of the seal part.

According to a first embodiment, the exhaust tube or the two exhaust tubes are made firmly fastened to the seal part at a passage opening in communication with the lower chamber.

A variation of this embodiment provides for the exhaust tube or tubes being made in one piece and possibly of the same material as the seal part.

An additional embodiment variation provides instead that the exhaust tube or tubes are sealingly fastenable to the seal part at a corresponding opening in communication with the lower chamber.

In this embodiment variation, the end of each exhaust tube can be provided with a hub connecting to the corresponding communication opening in any way, for example by snap coupling and/or form fit and/or elastic force fitting on a cooperating connection to the seal part.

According to still a further embodiment variation an element is provided sealingly and removably fastening the end of an exhaust tube to the communication opening of the seal part, which element is a separate constructional part intended to be interposed between said end of an exhaust tube and the corresponding communication opening, while said fastening element has members firmly and/or releasably fastening, on one side, to corresponding members on the end of the exhaust tube, and on the other side, to the wall delimiting said opening.

An additional embodiment can provide that at the communication opening a non-return valve is provided oriented such to allow the flow from the lower chamber to the exhaust tube and prevent the flow in the opposite direction.

Such a characteristic can be provided for any of the two embodiments and the several embodiment variations afore described and pertaining the alternatives for connecting the exhaust tube or tubes to the communication opening in the seal part.

Such a characteristic can also be provided in combination with any embodiment of the exhaust tubes and also in combination with an embodiment of the exhaust tube or tubes for example according to the document WO2015/170013.

An embodiment variation of the non-return valve provides that the same is integrated in the coupling end of the end of an exhaust tube at the corresponding opening in communication with the lower chamber.

In an embodiment, the non-return valve has a diaphragm plug made in one piece with the seal part and held in place perpendicular to the axis or to the passage direction in the port of the communication opening by material bridges, while the fastening members are composed of members sealingly clamping a valve annular seat and an abutment annular wall overlapping the opposite faces of the wall strip surrounding said communication opening and also a peripheral strip of the diaphragm plug.

According to still another feature, the ends coupling an exhaust tube to a corresponding communication opening are provided with anti-rotation counterchecks of said exhaust tube with respect to the communication opening around the axis thereof.

Still according to a further embodiment that can be provided in combination with one or more of the preceding embodiments, at least along a part of the side branches of the frame and of the seal part, said frame and said seal part form a channel with a substantially V shaped cross section, with the closed vertex facing the central region of the mask, while the exhaust tube has a V shaped section which is shaped and sized correspondingly to the section and size of said channel, said exhaust tube being housed in said channel in the mounted condition and a wall thereof, on the side opposite the central region of the mask, forming a wall connecting the surface of the frame and of the seal part on the same side opposite the central region of the mask.

In all the depicted embodiments, the end of each exhaust tube opposite the one for fastening to the seal part has an end for coupling to the corresponding connecting inlet.

In an embodiment, the snorkel or an end connecting said snorkel to the mask have an inlet connecting the exhaust tube to a channel or an exhaust duct provided in said snorkel and/or in said hub, which consists of a side branch union on which the end of the corresponding exhaust tube is sealingly and by elastic force fitted, possibly by interposing one or more seal parts, said branch union being oriented correspondingly to an extension of said exhaust tube towards the snorkel and/or the hub.

The mask according to an embodiment comprises a frame 1, having generally elongated shape, for example oval or the like, which fastens a front transparent portion 2 to a seal part 3 adapted to be sealingly placed on and against the diver face.

The seal part 3, made of rubber or other flexible material such as for example neoprene, has a partition wall 103 adapted to be rested on the user's nose, when the mask is worn, so as to form an upper chamber 203 and a lower chamber 303, the lower chamber 303 accommodating the nose and the mouth whereas the upper chamber 203 the eyes of the user.

The two chambers communicate through a passage provided in the partition wall 103 in which a one-way, in particular non-return, valve 403 is housed and oriented so that air can flow from the upper chamber 203 to the lower chamber 303 and not vice versa. In the embodiment shown, the valves 403, and the respective passages, are two and arranged on opposite sides of the partition wall 103 with respect to a median longitudinal line, i.e. the sagittal plane of the user's head.

The mask comprises a snorkel 4 communicating the upper chamber 203 and the lower chamber 303 with the outer environment and that will be described in detail hereinafter.

The transparent portion 2, made of glass or plastic material, is the visor of the mask through which the user is able to see to explore the marine environment. In its simplest configuration, the transparent element has a smooth convex surface having a peripheral edge which follows the contour of the frame 1 to be engaged into a throat thereof. The coupling is of the type adapted to make a seal and can provide that the edge of the transparent element is provided with a flange forming a protruding edge adapted to be engaged into an undercut compartment of the throat provided in the frame 1.

The coupling can also take place by snap-fit or shape coupling as in the mask described in the document WO2015/170013.

The seal part 3, having an elongated configuration following the contour of the frame 1 and, more generally, the user's face, has a perimetrical edge 503 with four openings. The first one, positioned at the zone adapted to be arranged near the user's mouth, accommodates a purge valve 603 to eject possible water that can enter the mask.

The second opening 703 is arranged on the top of the perimetrical edge to receive air to convey into the upper chamber 203 from the snorkel 4.

The other two openings are positioned on opposite sides of the perimetrical edge 503 and lead to the lower chamber so as to receive exhaled air that is conveyed towards the snorkel 4 by means of a couple of exhaust tubes 903 arranged on the perimetrical edge 503 and adjacent thereto, as shown in the figures.

For this purpose, the snorkel 4 is divided in three dedicated non-communicating channels, the first central one 104 at the air inlet and the other two 204, which are lateral, at the air outlet. The snorkel 4 engages into the upper opening of the frame 703 so as to communicate the central channel 104 directly with the upper chamber 203 and the side channels 204 with the lower chamber 303 by means of the couple of exhaust tubes 903. This way the inhaled air reaches the nose and the mouth of the user by flowing through the snorkel 4 to the lower chamber 303 by means of the upper chamber 203 of the mask, whereas the exhaled air is directly conveyed from the lower chamber 303 to the snorkel 4, in the side channels 204 to be ejected.

As better shown in FIGS. 4 to 7, the snorkel 4 has a hub 5 between tube and mask, which hub is intended to remain fastened to the mask and connects to the snorkel 4 by means of a joint having a coupling position in which the hub 5 and the snorkel 4 are fastened in operating position and a releasing position of the snorkel 4 from the hub 5 in which the snorkel 4 remains however connected to the hub 5, but is free to swing. In the embodiment depicted, the swing of the snorkel 4 with respect to the hub 5, and thus the mask, takes place along an axis perpendicular to the axis of the snorkel and oriented along a frontal slice plane of the head wherein the term frontal plane refers to the definition of the slice planes of the human body used in medicine.

An alternative definition of the direction of the swing axis refers to the plane central portion 102 of the front transparent portion 2, such a swing axis being contained in a plane parallel to said plane portion 102 of the frontal element.

When the transparent element is curved, the aforesaid definition can be extended to the plane tangential to said curved surface which, in addition, is perpendicular to the plane passing by the central axis of the snorkel 4.

The hub 5 consists of a central duct 105 and two side ducts 205 in which corresponding extensions of the central channel 104 and side channels 204 of the tube 4 are engaged, at an end.

The opposite end of the hub 5 is closed and has fins 405 for the engagement with corresponding fins 101 that are on the frame 1, which are kept in position by a hooking surface 702 that is on the transparent element 2 when the mask is assembled.

The central duct 305 of the hub 5, at the opposite end to the tube 4, has an opening below which engages into the hole 703 on the top of the perimetrical edge 503, whereas each one of the two side ducts 205 leads to a corresponding radiusing side branch 605 onto which the corresponding exhaust tube 903 is engaged, the seal being generated by one or more seal parts 705.

In practice the tube can be brought from an operating position to a resting position and vice versa thanks to the use of a combined translatory and rotary movement, wherein the translatory movement has the function of releasing the tube 4 from the hub 5 albeit keeping it connected thereto, so as to prevent the accidental loss thereof.

As it is apparent, the snorkel 4 is connected to the hub 5 by means of a film hinge.

This consists of a tongue or a bridge of flexible and elastic material that is fastened with one of its two opposite ends respectively to the snorkel 4 and the hub 5.

The material tongue 110 passes inside a loop 804 and 805 provided respectively on the rear or lower side of the snorkel 4 and the hub 5, while a thickness widening 210 like a tooth or the like on the portion of said tongue 110 protruding beyond the side of the corresponding loop 804, 805 opposite the facing loop, respectively 805, 804, being provided.

The loops can have in the middle zone an opening 814, 815 for inserting the tongue and having a length slightly larger than the thickness of the tongue 110 and remarkably smaller than the width of said tongue, such as to allow the tongue to be inserted in said loops.

The tongue 110 can slide in the two loops 804, 805, but cannot slip off the same thanks to the thickenings 210.

Advantageously, the tongue is also elastically extensible to such an extent to ensure the slip-off travel of the ends of the channels 204, 104 of the snorkel 4 from the ducts 105, 205 of the hub 5.

Advantageously, the distance of the loops 804, 805 and the position of the widenings 210 on the tongue 110 are such that, in the completely engaged condition of the ends of the channels 204, 104 into the corresponding ducts 105, 205, the tongue remains still tensioned at a predetermined degree such to generate a tension force along the engagement direction of the snorkel 4 into the hub 5. This allows applying a force which permanently stresses said snorkel 4 in the operating position, i.e. in the condition of complete engagement into the hub 5.

By suitably selecting the elastic characteristics of the tongue and the elongation conditions thereof in the two end positions of complete engagement of the snorkel 4 in the hub 5 and of complete disengagement of the snorkel 4 from the hub 5, a disengagement force to disengage the snorkel 4 from the hub 5 can be applied manually, which force counters and overcomes the force applied by the tongue 110 along the engagement direction.

Once the snorkel 4 has been disengaged from the hub 5, the tongue 110 reverts to the neutral condition in which it is not restrained in an elongation position and only acts as connection of the snorkel 4 to the hub 5, which connection allows a reciprocal relative swing of these portions.

As it is apparent from the figures, in an embodiment the tongue 110 is formed by the upper fastening end member of a fastening belt 10 to fasten the mask to the user's face, for example in the form of a fastening extension.

According to a further characteristic, the snorkel 4 has, at the end opposite the frame 1 of the mask, i.e. the hub 5, an end member 11 housing in its inside a float valve which closes at least the air suctioning channel 44 when the end of the snorkel 4, i.e. the end member 11 mounted on said end, takes a position with respect to the surface of water in which water can penetrate inside at least said channel 104.

The exhaust tubes 903 are made as separate constructional parts removably connecting with an end to an opening in communication with the lower chamber 303 and provided in the seal part 3 and with the other end to the hub 5.

The coupling takes place by a snap-fit interlocking coupling end member consisting of a ring provided with a crown of radial teeth provided at the ends with axial tongues elastically flexible in radial direction, the teeth and tongues engaging with the edge delimiting an opening provided in the seal part 3.

According to still a further characteristic, between the end of the exhaust tube 903 and the opening in the seal part 3 a non-return valve is advantageously provided with diaphragm plug that is oriented to not allow the return flow from the exhaust tube 903 to the lower chamber 303.

The embodiment depicted shows an embodiment variation of the diaphragm or non-return valve according to the present invention that is particularly advantageous. This embodiment provides for making the diaphragm plug 130 integrated with the wall of the seal part 3 at the through opening 30 and in communication with the lower chamber 303.

Figure 1:
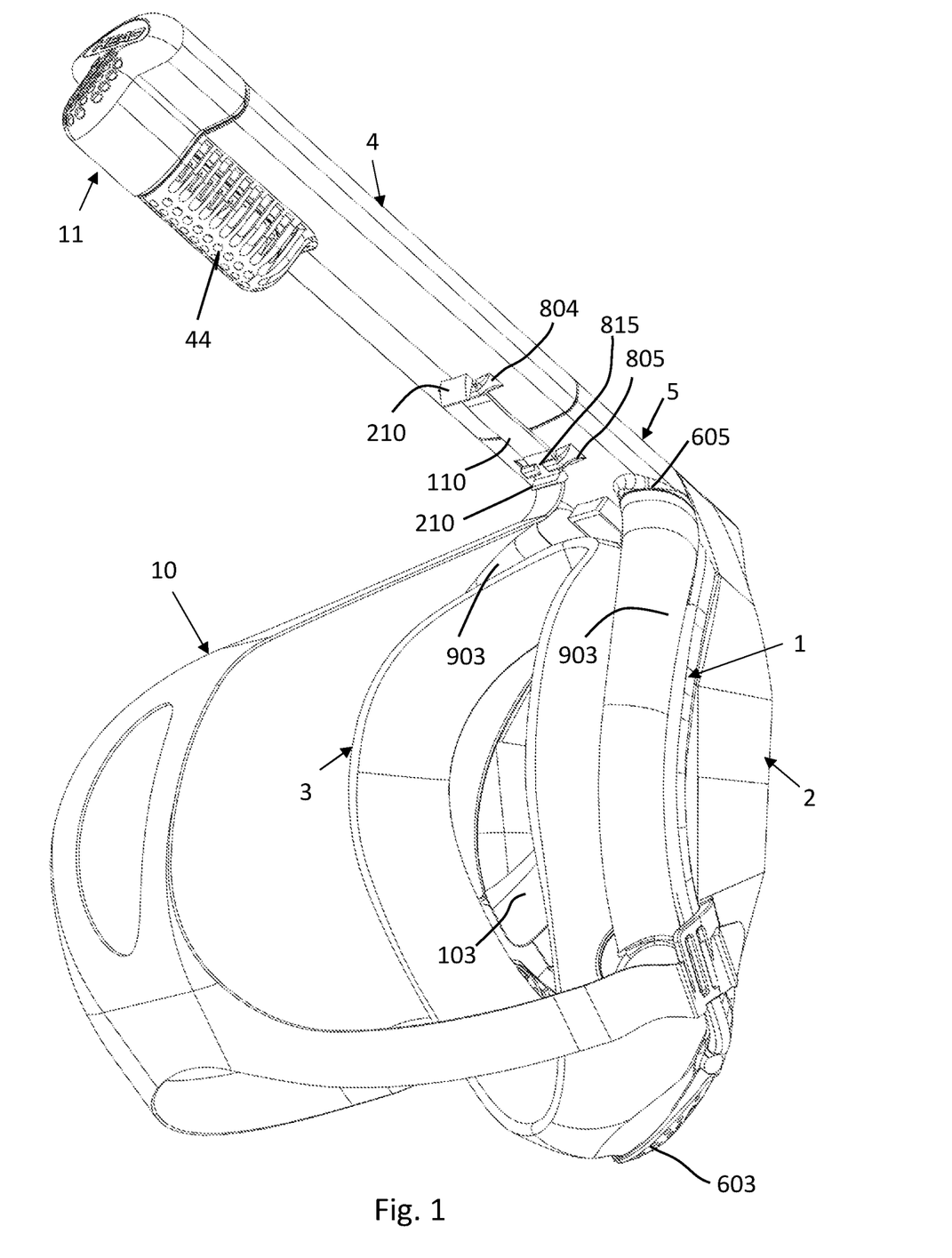
FIGS. 1 to 4 show different views according to different directions of an embodiment of a non-limiting example of a mask having a diaphragm valve according to the present invention.
Figure 2:
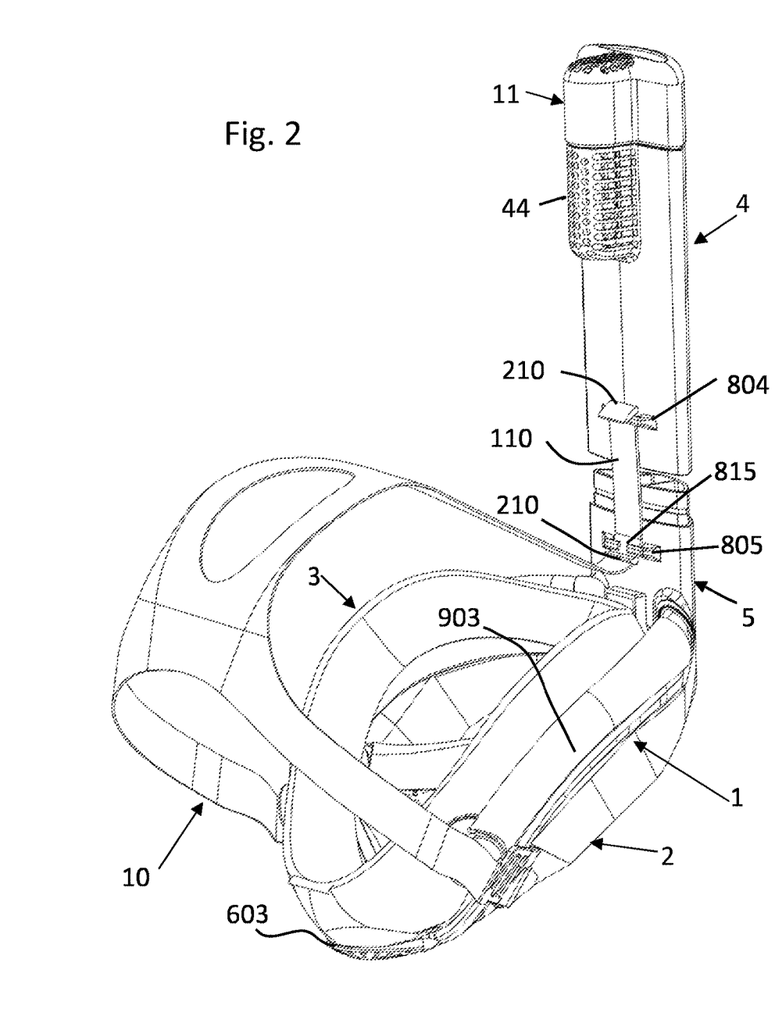
Figure 3:
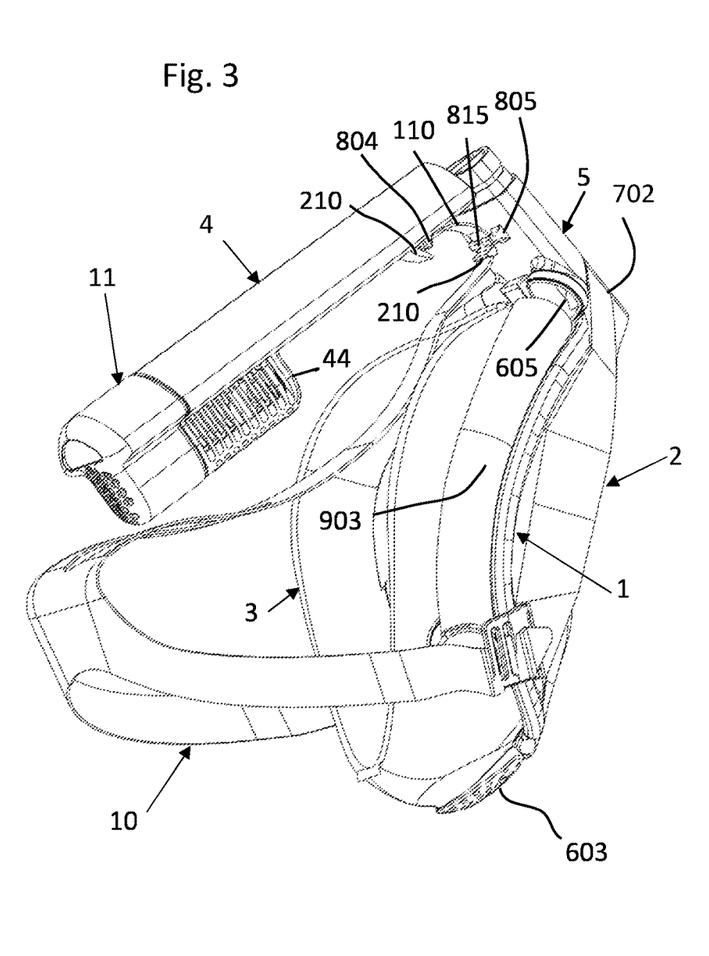
Figure 4:
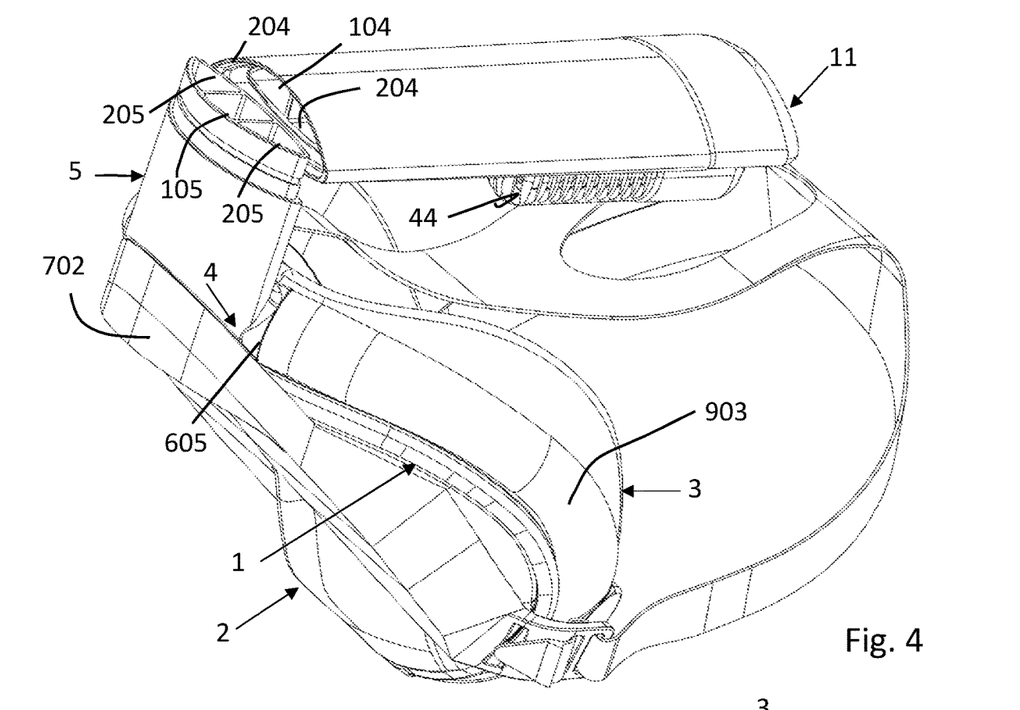
Figure 5:
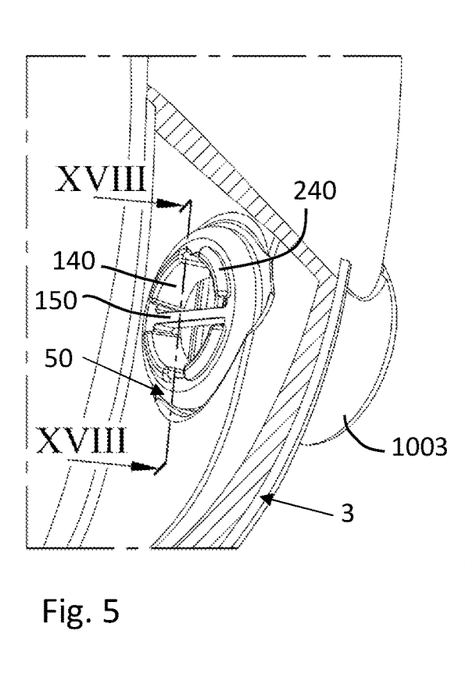
FIG. 5 shows a view of an enlarged detail of the mask according to FIGS. 1 to 4 in the zone of a diaphragm valve provided in the coupling zone of the exhaust tubes for ejecting the exhaled air and wherein the direction of view is from the inside of the mask outwards.
Figure 6:
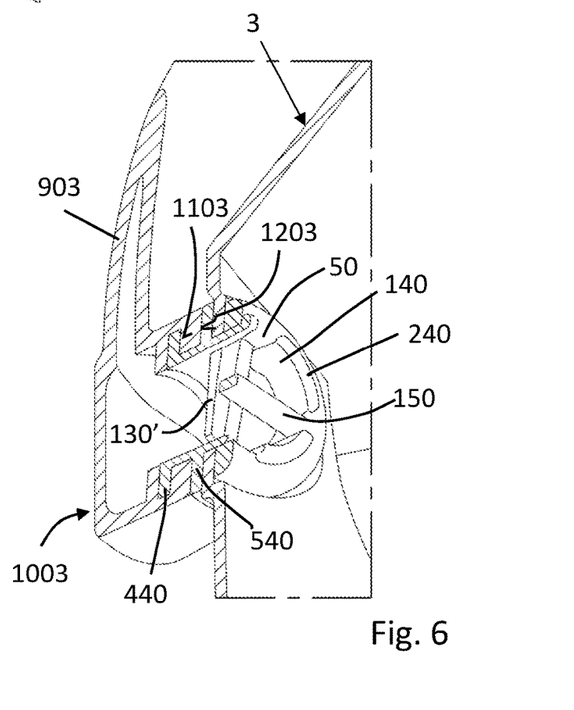
FIG. 6 shows a section of said detail along the section plane parallel to the passage axis of the valve and the line XVIII-XVIII of FIG. 5.
Figure 7:
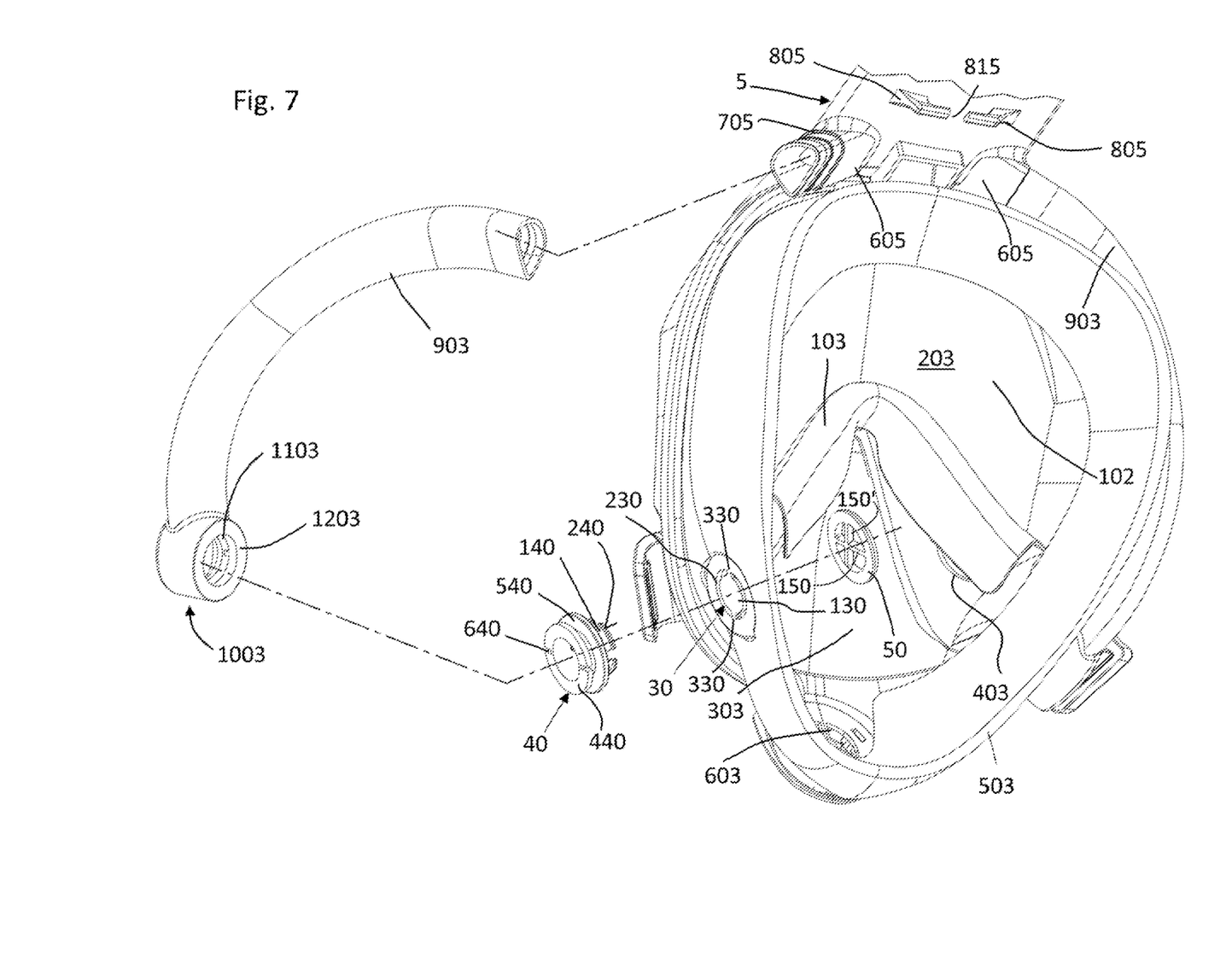
FIG. 7 shows a perspective view from the rear end of the mask, wherein a duct for ejecting the exhaled air is shown in an exploded view.

As it is apparent from FIGS. 5 to 7, in the opening 30 a disk 130' is restrained in coaxial position, which disk is constituted by the same material as the seal part 3. The disk 130' has a diameter smaller than the diameter of the opening 30 and forms an annular slit 230 with the edge thereof. The disk 130' is restrained in a centered position with respect to the opening 30 thanks to two material bridges 330 reciprocally diametrically opposite.

A locking bushing of rigid material having a predetermined elasticity denoted by 40 forms a snap-fit coupling fastening end member of the end of the exhaust tube 903 to the seal part 3 in the zone of said opening 30.

In particular, said bushing 40 forms at the same time the annular element fastening to the seal part 3, i.e. to the supporting wall, of a valve seat 50 cooperating with the diaphragm plug 130. The valve seat 50 consists of a ring restrained in position against the diaphragm plug 130 by the locking bushing 40. This has on the side facing towards the seal part 3 a crown of flexible axial tongues 140 having external radial teeth 240 at their ends. The tongues are arranged along a circumference line having such a radius and such an axial length that, in assembled condition, they penetrate through the slit 230 between diaphragm plug 130 and edge of the opening 30 and overlap the end teeth 240 on the side of the ring forming the valve seat 50 and facing the inside of the lower chamber 303.

The axial length of the flexible tongues 140, compared to the overall thickness of the wall of the seal part 3 at the opening 30 and the ring constituting the valve seat 50, is such that the bushing 40 and the ring constituting the valve seat 50 are sealingly tightened against the wall of the seal part 3 at the zone surrounding said opening 30.

According to a possible further characteristic, the ring constituting the valve seat 50 can further have a central diametrical rib 150 forming an intermediate support for the two halves of the disk constituting the diaphragm plug 130, said rib 150 being oriented transversally to the diametrical axis along which the material bridges 330 that fasten the disk to the edge of the opening 30 are aligned.

The locking bushing 40 can be made in a single piece or permanently fastened to the end of the exhaust tube 903, or said bushing 40 can be sealingly fixable by interlocked coupling or by shape coupling or by elastic force fit. The coupling is sealingly made between the exhaust tube 903 and the locking bushing 40.

An embodiment of this last variation is depicted in FIG. 7. In this case, the bushing 40 has on the side for coupling with an interlocking seat 1003, at the end of the exhaust tube 903, an annular flange 440 forming an outer radial fin intended to be engaged by elastic forcing into a corresponding annular inner throat 1103 provided in the end of the tube 903. The throat 1103 is provided at such a distance from the head side of the end of the exhaust tube 903, corresponding to the distance of the annular flange 440 from an annular countercheck surface 540, that in the condition wherein the locking bushing 40 is coupled to the end of the exhaust tube 903, the head side 1203 of said end is sealingly compressed against the annular countercheck surface 540 and possibly further by tightening the wall of the tubular length between the throat 1103 and the head side 1203 at the end of the tube 903 sealingly against the tubular length connecting the annular flange 440 to the annular countercheck 540.

Still according to a further characteristic, the annular flange 440 has at least one radial notch 640 in which a radial rib provided in the annular throat 1103 for engaging said annular flange 440 is engaged.

As it is apparent, the different embodiments of the joint of the snorkel to the mask and the different embodiment variations of the exhaust tubes 903 can be provided in any reciprocal combination.

The invention claimed is:

1. A diaphragm valve in combination with a supporting wall for said diaphragm valve, said supporting wall being made of a flexible or elastically deformable material and being attached to a body,
    wherein said supporting wall is separate from said diaphragm valve,
    wherein said diaphragm valve is adapted to be mounted at an opening provided in said supporting wall of said body so as to adjust a passage of fluids across said supporting wall,
    wherein said diaphragm valve comprises:
    a diaphragm plug made of an elastic, flexible material;
    a valve seat comprising at least one passage opening surrounded by a continuous surface, for a sealing contact of at least one corresponding sealing lip of the diaphragm plug,
    wherein the diaphragm plug is made in one piece with and of the same material as the supporting wall, the diaphragm plug being separated along its perimetric edge from said supporting wall by slots delimiting said perimetric edge and said slots having a predetermined width, wherein at least two material bridges provided on opposite sides of the perimetric edge of said diaphragm plug couple said diaphragm plug to said supporting wall;
    the valve seat being configured as a shaped plate and being locked to the supporting wall in a position coinciding with the diaphragm plug by a tightening ring, and,
    the valve seat being provided on one side of the supporting wall and the tightening ring on the opposite side of the supporting wall and the valve seat and/or the tightening ring having mutual engagement means passing through at least part of said slots.

2. The diaphragm valve according to claim 1, wherein the diaphragm plug has a circular or elliptical or ovoid shape or an elongated shape with semi-circular shaped ends, and wherein the two material bridges connecting the diaphragm plug to the supporting wall are provided along an axis of symmetry of the diaphragm plug.

3. The diaphragm valve according to claim 1, wherein the shape of the diaphragm plug is circular, wherein the slots separating the diaphragm valve from the supporting wall are semi-circular slots, separated from each other by one of the at least two material bridges, and wherein the at least two material bridges are arranged diametrically opposite each other and aligned along the same diametral axis, and wherein the tightening ring has sealing and mutual fastening means for the valve seat.

4. The diaphragm valve according to claim 1, wherein the tightening ring has appendages, wherein the appendages are elastically flexible and have end teeth overlapping the side of the valve seat opposite the supporting wall, and wherein the appendages have a length to exert, when coupled to the valve seat, a sealing compression of the tightening ring against the supporting wall.

5. The diaphragm valve according to claim 3, wherein the valve seat or the tightening ring is provided with an inner thread and with externally threaded axial appendages respectively intended to pass through the semi-circular slots and to engage said inner thread.

6. The diaphragm valve according to claim 1, wherein the valve seat has at least one an inner rib connecting two opposite points of an inner annular edge of the valve seat.

7. The diaphragm valve according to claim 6, wherein the valve seat and the diaphragm plug each have a circular symmetry or a circular shape.

8. The diaphragm valve according to claim 6, wherein said inner rib is oriented transversely to an axis along which the at least two material bridges connecting the diaphragm plug to the supporting wall are aligned.

9. The diaphragm valve according to claim 1, wherein the valve seat has two or more inner ribs connecting opposite points of an inner annular edge of the valve seat, the two or more inner ribs being oriented in different directions.

10. A method of manufacturing a diaphragm valve in combination with a flexible or elastically deformable supporting wall and according to claim 1, said method comprising the following steps:
    producing the diaphragm plug of the same material as the supporting wall;
    separating the diaphragm plug from the remaining supporting wall by slots surrounding a perimetric shape of the diaphragm plug, each slot being defined between two points aligned with each other by material bridges connecting said diaphragm plug to the remaining supporting wall;
    producing the valve seat in the form of a plate provided with a sealing surface cooperating with a sealing lip of the diaphragm plug and with a tightening flange of an annular strip of the supporting wall surrounding said valve seat;
    producing a tightening ring provided with a flange tightening the supporting wall to a wall of the valve seat;
    providing, on the valve seat and/or on the tightening ring, a crown of flexible axial tongues with radial teeth extending from ends of the flexible axial tongues, the flexible axial tongues being configured to be received through one or more of said slots separating the diaphragm plug from the remaining supporting wall; and
    locking the valve seat to the tightening ring with the flexible axial tongues, so as to generate the sealing tightening between said flanges of the valve seat and of the tightening ring of the annular strip of the supporting wall surrounding the diaphragm plug.

11. An equipment element for underwater activities comprising:
    a diaphragm valve according to claim 1; and
    a body with the supporting wall made of the flexible or elastically deformable material, the supporting wall being coupled to the diaphragm valve.

12. The equipment element for underwater activities according to claim 11, wherein said equipment element is a diving mask or diving goggles.

13. A method of manufacturing an equipment device for underwater activities, the equipment device comprising a diving mask having in combination a diaphragm valve engaged to a supporting wall of a body of said equipment device, said method comprising the steps of: manufacturing the diaphragm valve in combination with the supporting wall according to claim 10;
    whereby mechanically engaging the diaphragm valve to the supporting wall.

* * * * *